(12) United States Patent
Lim

(10) Patent No.: US 9,702,331 B2
(45) Date of Patent: Jul. 11, 2017

(54) BUTTON-TYPE CAR IGNITION SYSTEM

(71) Applicant: DAESUNG ELECTRIC CO., LTD, Gyeonggi-do (KR)

(72) Inventor: Sung Won Lim, Gyeonggi-do (KR)

(73) Assignee: Daesung Electric Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/428,378

(22) PCT Filed: Sep. 23, 2013

(86) PCT No.: PCT/KR2013/008492
§ 371 (c)(1),
(2) Date: Mar. 16, 2015

(87) PCT Pub. No.: WO2014/046508
PCT Pub. Date: Mar. 27, 2014

(65) Prior Publication Data
US 2015/0233335 A1    Aug. 20, 2015

(30) Foreign Application Priority Data
Sep. 21, 2012   (KR) .................. 10-2012-0105027

(51) Int. Cl.
*H01H 3/02* (2006.01)
*H01H 3/14* (2006.01)
(Continued)

(52) U.S. Cl.
CPC ...... *F02N 11/0803* (2013.01); *B60R 16/0235* (2013.01); *F02D 11/02* (2013.01);
(Continued)

(58) Field of Classification Search
CPC .. H01H 3/00; H01H 3/02; H01H 3/12; H01H 9/16; H01H 9/18; H01H 9/161;
(Continued)

(56) References Cited

U.S. PATENT DOCUMENTS 5,729,057 A     3/1998   Frenzel et al.
5,990,435 A *  11/1999   Chao ................... H01H 13/702
                                                        200/345
(Continued)

FOREIGN PATENT DOCUMENTS

CN   101665108   3/2010
CN   102472238   5/2012
(Continued)

OTHER PUBLICATIONS

Translation of Search Report from corresponding Japanese Patent Application 2015-532970 dated Jan. 20, 2016 (7 pages).
(Continued)

*Primary Examiner* — Anthony R. Jimenez
(74) *Attorney, Agent, or Firm* — Anderson Gorecki LLP

(57) ABSTRACT

The present invention relates to a button-type car ignition system. The present invention includes: a housing the upper and lower portions of which are open; an upper plate coupled with an upper end of the housing; a moving button disposed inside the housing; a cover coupled with the lower portion of the housing; a printed circuit board disposed inside the housing; a key pad pressurized by the moving button; a light guide member that guides light generated by the light-emitting diode to the moving button; and an antenna coil that transmits and receives a wireless signal to and from an ignition key. According to the present invention, no additional components are required to install the antenna coil, and thus the number of components can be reduced, the number of assembly steps is reduced, and productivity is improved.

9 Claims, 8 Drawing Sheets

(51) Int. Cl.
*H01H 35/00* (2006.01)
*F02N 11/08* (2006.01)
*F02D 11/02* (2006.01)
*B60R 16/023* (2006.01)
*H01H 13/02* (2006.01)
*H01H 27/00* (2006.01)

(52) U.S. Cl.
CPC .......... *H01H 13/023* (2013.01); *H01H 27/00* (2013.01); *H01H 2219/036* (2013.01); *H01H 2219/062* (2013.01)

(58) Field of Classification Search
CPC ........ H01H 9/181; H01H 9/182; H01H 13/00; H01H 13/02; H01H 13/04; H01H 13/12; H01H 13/50; H01H 2003/12; H01H 2207/022; H01H 2219/036; H01H 2219/038; H01H 2219/014; H01H 2219/044; H01H 2231/026; H01H 3/14; H01H 35/00; H01H 13/023; H01H 27/00; H01H 2219/062
USPC ....... 200/400, 520–522, 237, 238, 252, 293, 200/296, 302.1, 302.2, 303, 310, 314, 200/317, 329, 332.1, 333, 341, 345, 17 R
See application file for complete search history.

(56) References Cited

U.S. PATENT DOCUMENTS 7,926,964 B2 * 4/2011 Claprood ............... G05G 1/105
362/23.01

2005/0093559 A1 * 5/2005 Mori ...................... H01R 12/58
324/755.11
2012/0075063 A1  3/2012 Sakamoto et al.

FOREIGN PATENT DOCUMENTS

| JP | 4-15141 | 4/1988 |
|---|---|---|
| JP | 1997-032384 | 2/1997 |
| JP | 2004-314806 | 11/2004 |
| JP | 2006-004690 | 1/2006 |
| JP | 2009-099503 | 10/2007 |
| JP | 2010-061838 | 3/2010 |
| JP | 2011-027085 | 2/2011 |
| JP | 2011-204508 | 10/2011 |
| KR | 10-2011-0006114 | 1/2011 |
| KR | 10-1025901 | 3/2011 |
| KR | 10-1042025 | 6/2011 |
| KR | 10-1066924 | 9/2011 |
| KR | 10-2012-0050040 | 8/2012 |
| KR | 10-1178169 | 8/2012 |

OTHER PUBLICATIONS

Office Action from corresponding Chinese Patent Application 201380049007.6 dated Apr. 22, 2016 (7 pages).
Extended European Search Report from corresponding European Patent Application 13839479.6 dated Jul. 11, 2016 (8 pages).
Notice of Allowance from corresponding Japanese Patent Application 2015-532970 dated Oct. 4, 2016 (3 pages).
International Search Report from International Application PCT/KR2013/008492.

* cited by examiner

[Fig. 1]
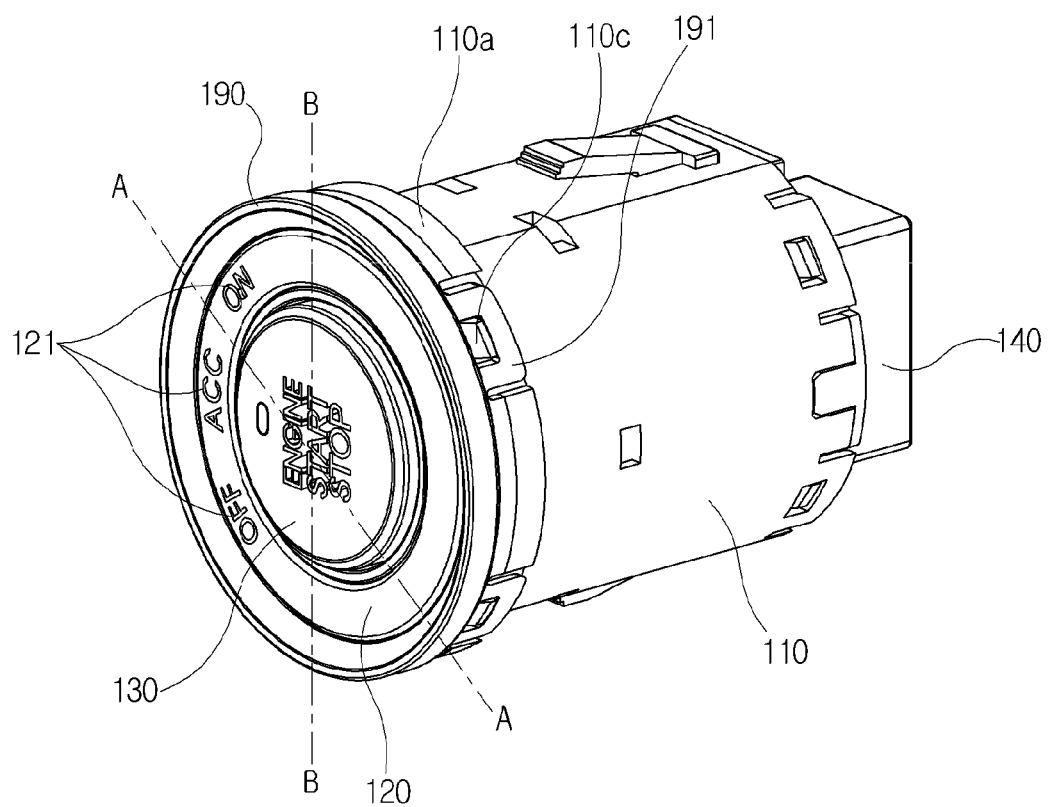

[Fig. 2]
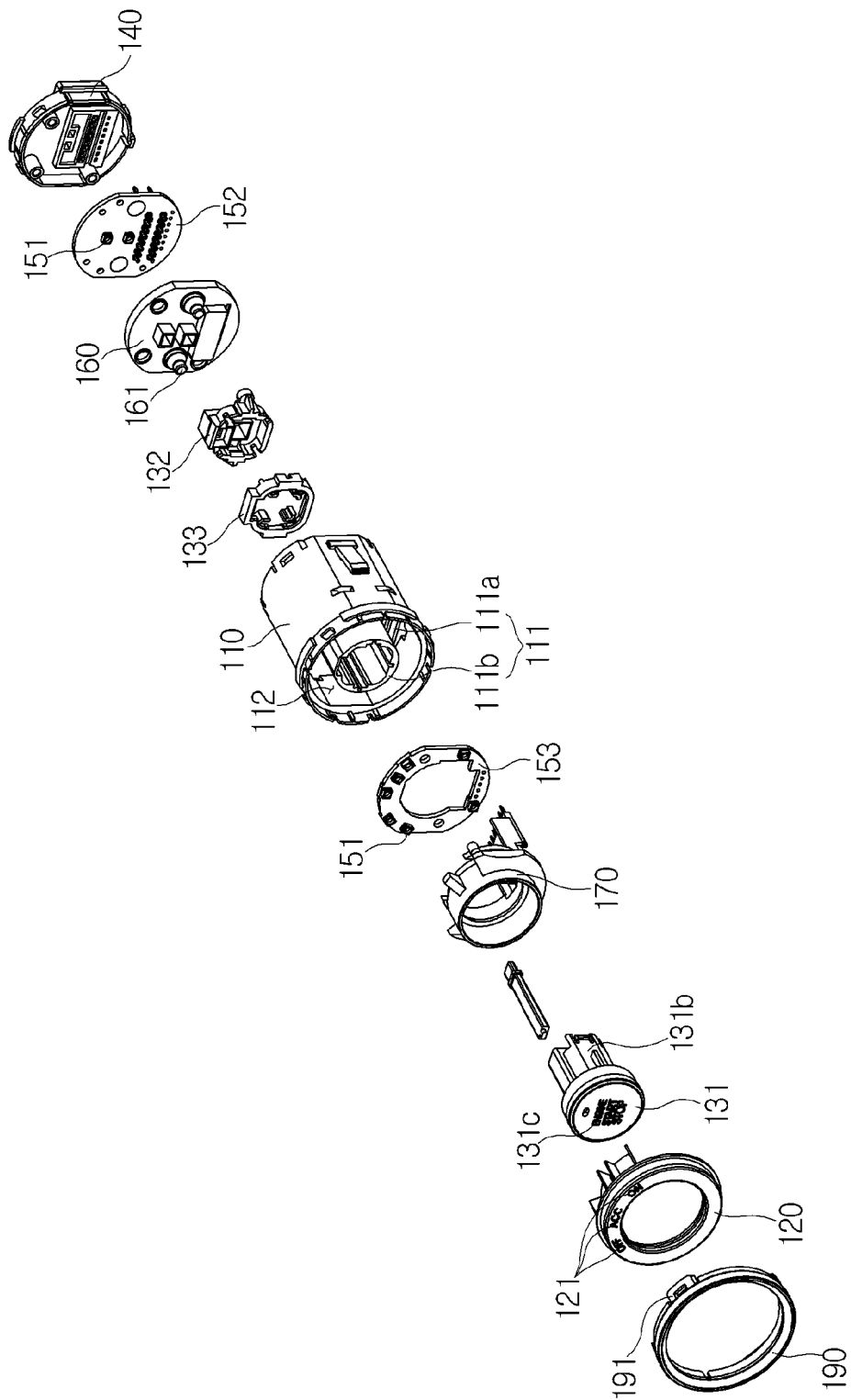

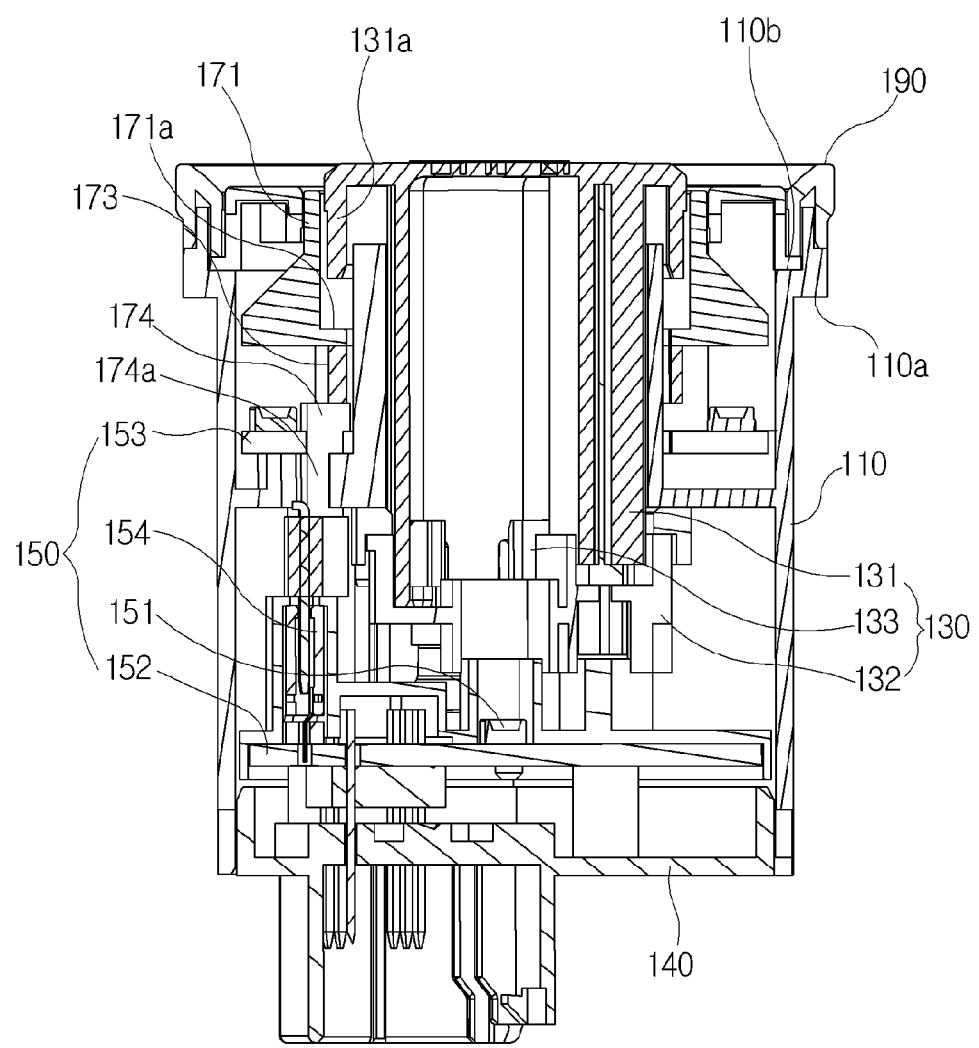
[Fig. 3]

[Fig. 4]
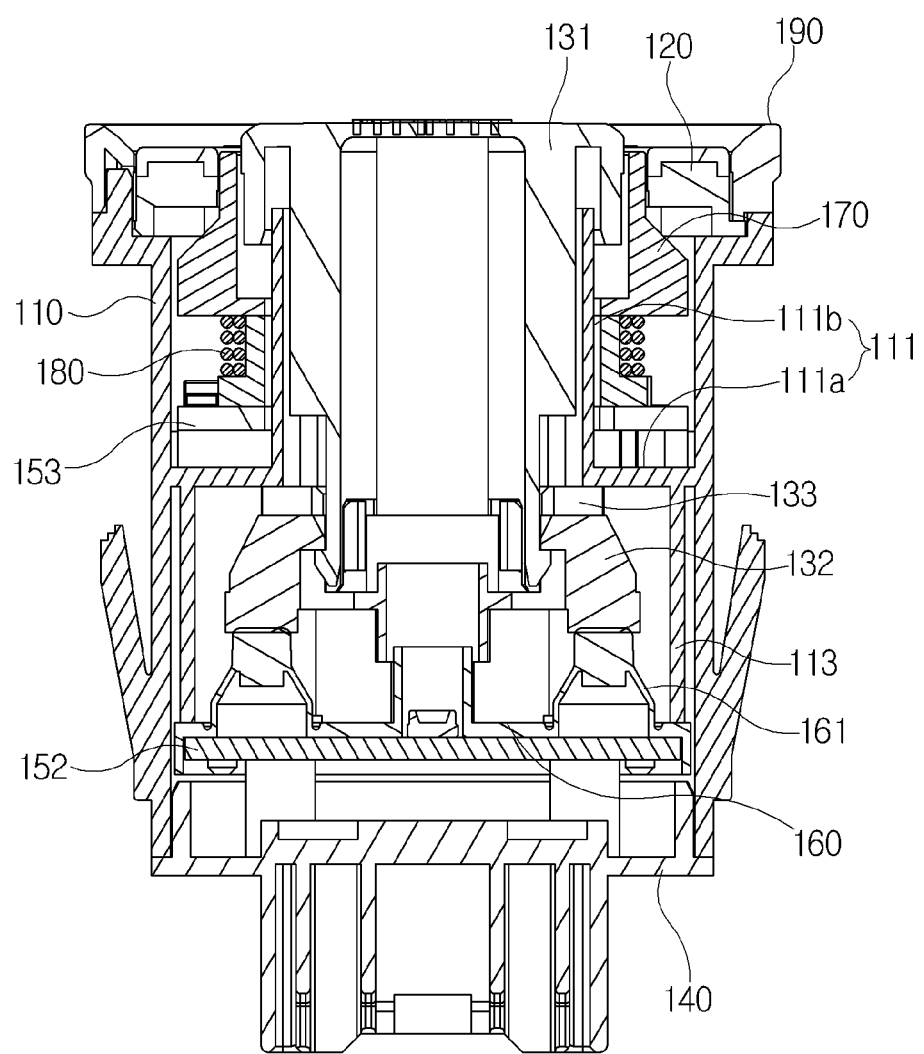

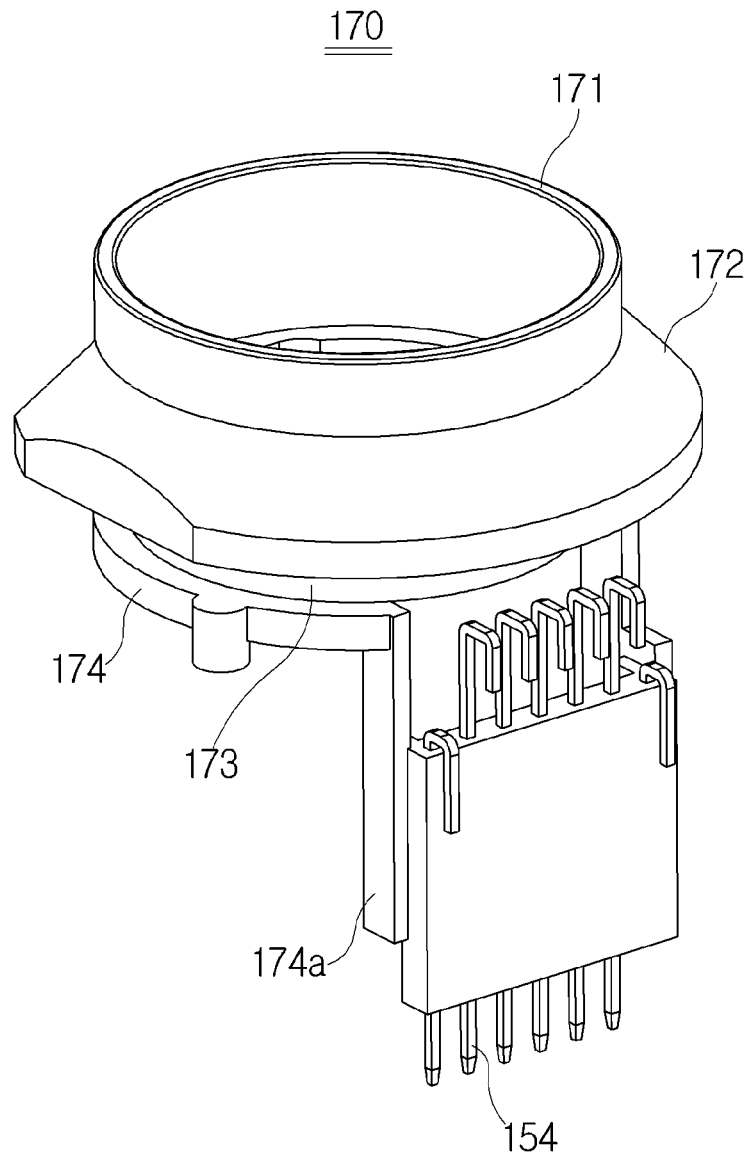
[Fig. 5]

[Fig. 6]
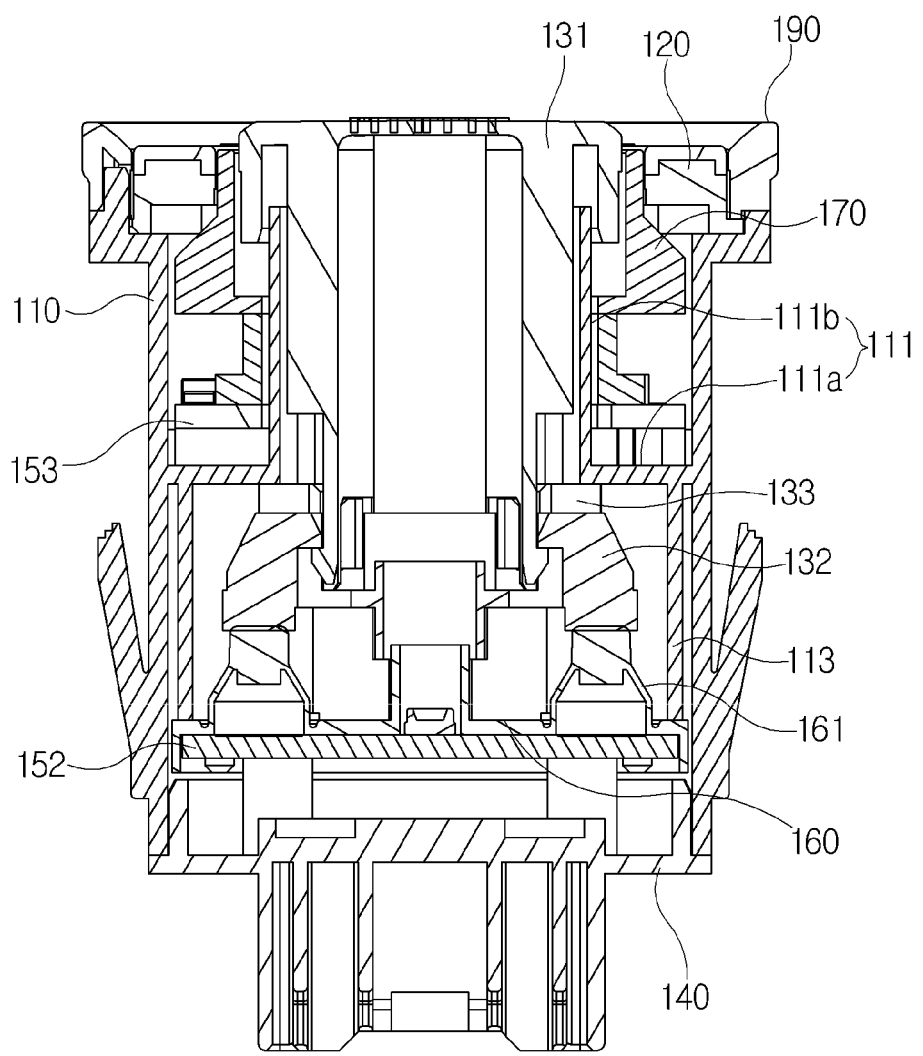

[Fig. 7]
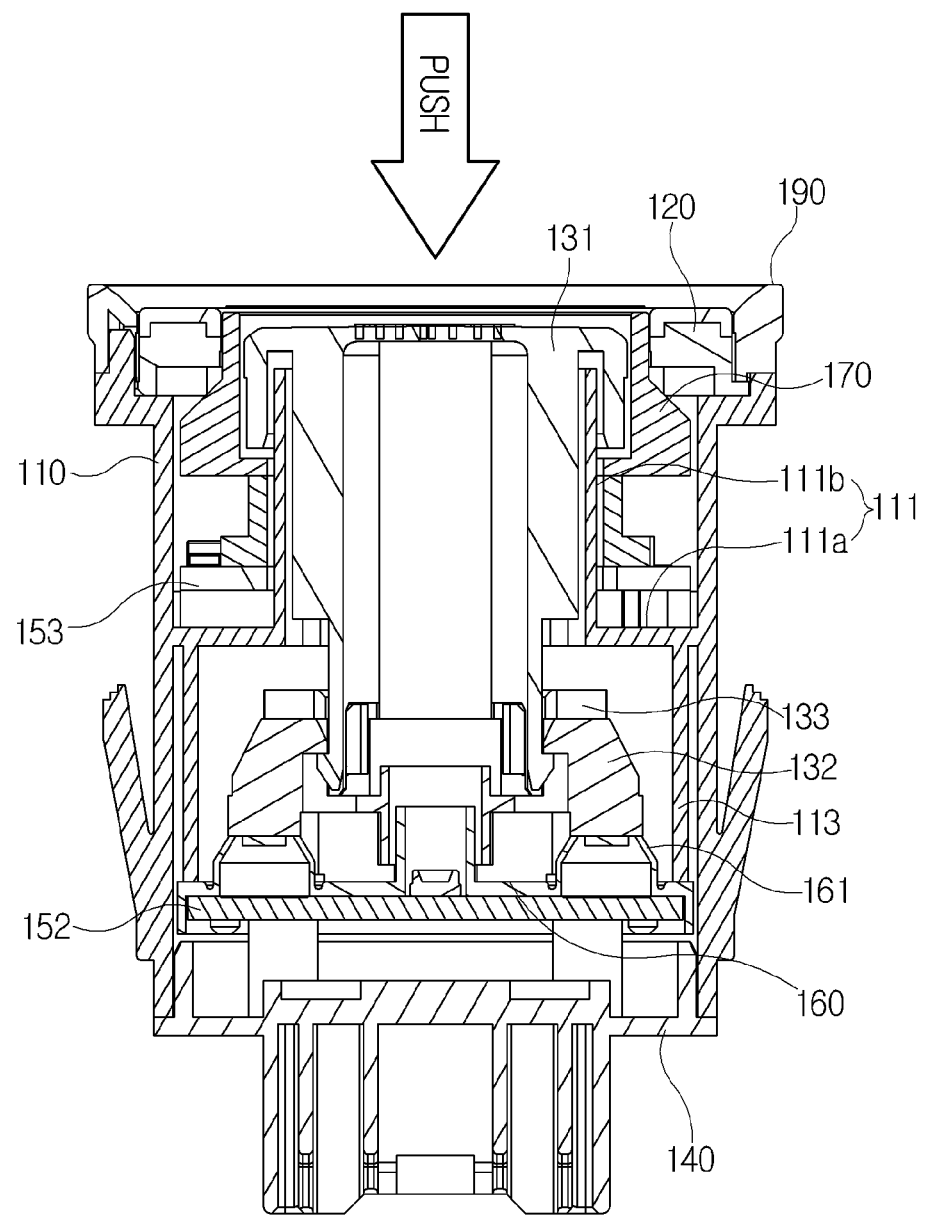

[Fig. 8]
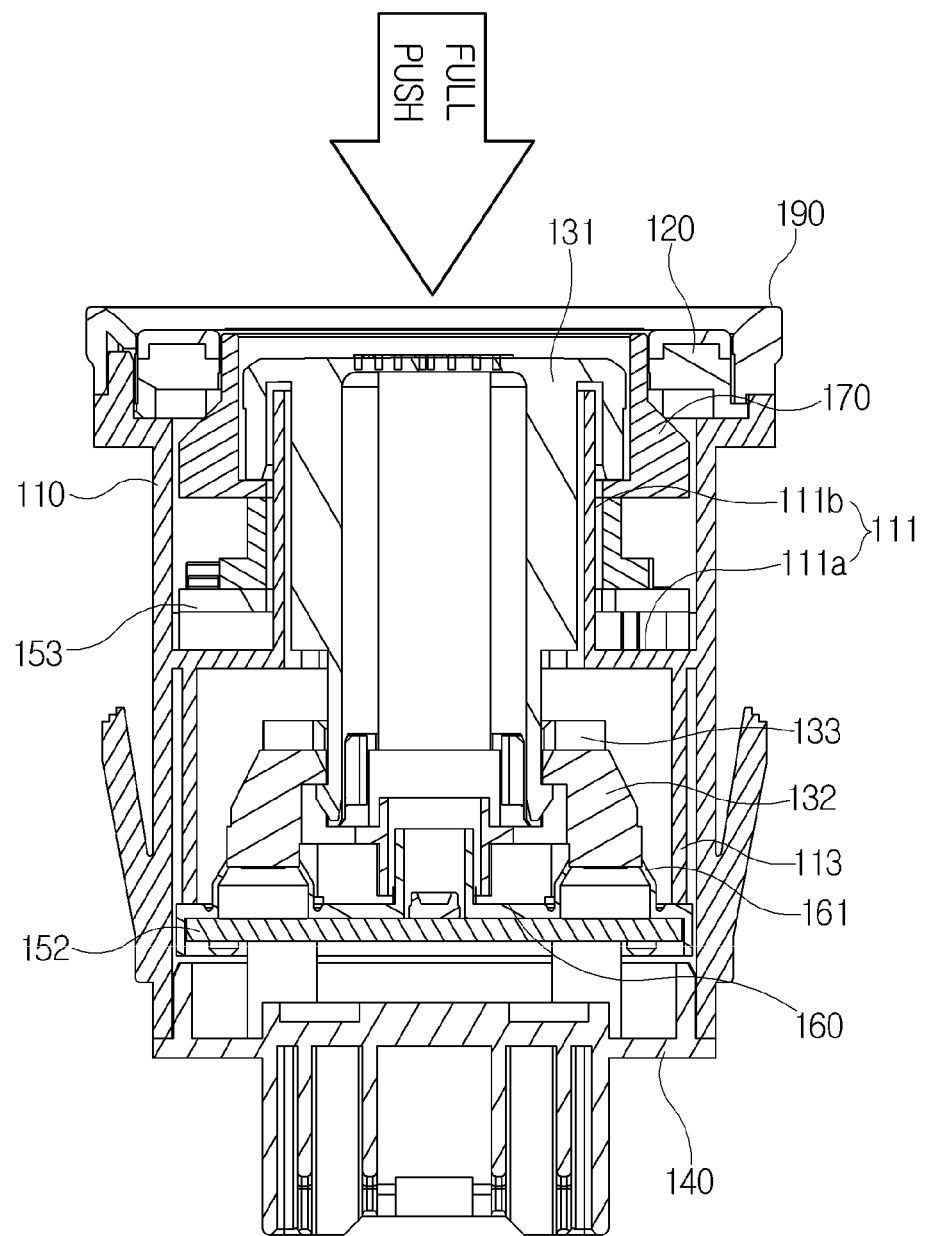

BUTTON-TYPE CAR IGNITION SYSTEM

TECHNICAL FIELD

The present invention relates to a button-type car ignition system, and more particularly, to a button-type car ignition system, capable of reducing separate parts for installing an antenna coil and reducing product cost by forming the antenna coil in a light guide member for guiding light to the outside.

BACKGROUND ART

In general, a button-type car ignition system is a device which senses a signal of a smart key carried by a driver boarding a car without insertion of an ignition key into a key cylinder so that the driver operates an engine by pushing a starter button and stops the operation of the engine by pushing the starter button in a state in which the engine is operated.

Such a button-type ignition system is disclosed in Korean Patent Laid-Open Publication Nos. 10-2011-0006114 and 10-2010-0019627.

A conventional button-type ignition system includes a moving assembly which is slidable installed within a cylindrical housing having opened upper and lower portions.

A covering is coupled to the upper portion of the housing. A key pad which provides elastic restoring force to the moving assembly is located at a lower side of the moving assembly.

A plurality of printed circuit boards are arranged at a lower side of the key pad, and a bottom cover for covering lower sides of the printed circuit boards is coupled to the lower portion of the housing.

The moving assembly includes a body having a tubular light guide portion for guiding light therein, a bumper which is coupled to an upper portion of the body and is made of an elastic material, and a button cover which is fixed to the body to cover the bumper.

A light shield member, a light-emitting ring, a light guide film, and a bobbin are provided between the moving assembly and the key pad. The bobbin has an antenna coil for transmitting and receiving wireless signals to and from an ignition key in a car. The antenna coil is electrically connected to the printed circuit boards by a coil connector installed at the bobbin. The bobbin has a light-emitting diode connected to the printed circuit boards by the coil connector.

The light guide film is used to uniformly emit light of the light-emitting diode in a certain region. The light-emitting ring is a component which is located at an upper portion of the light guide film to receive and emit the light uniformly emitted by the light guide film, thereby enabling the light to be identified from the outside. The light shield member serves to emit the light emitted by the light-emitting ring only at a suitable portion.

Since the conventional button-type ignition system further includes the bobbin coupled to the housing for installing the antenna coil and the coil connector for connecting the antenna coil to the printed circuit boards, there are problems in that the number of product parts is increased, productivity is deteriorated due to increase in assembly man-hour, and manufacturing cost of the parts is increased.

DISCLOSURE

Technical Problem

Accordingly, the present invention has been made in view of the above-mentioned problem, and an object thereof is to provide a button-type car ignition system, capable of reducing assembly man-hour and manufacturing cost of a product since separate parts are not required by forming an antenna coil in a light guide member for guiding light.

Technical Solution

In accordance with an aspect of the present invention, a button-type car ignition system includes a housing having opened upper and lower portions, an upper plate coupled to an upper end of the housing and having a through-hole, a moving button arranged to reciprocate inside the housing, a cover coupled to the lower portion of the housing, a printed circuit board arranged inside the housing and having one or more light-emitting diodes, a key pad having an elastic protrusion portion pressed by the moving button, a light guide member for guiding light generated by the light-emitting diodes to the moving button, and an antenna coil installed to the light guide member so as to transmit and receive wireless signals to and from an ignition key.

The printed circuit board may include a first substrate provided between the cover and the key pad and having a light-emitting diode installed to radiate light to the moving button, a second substrate having a light-emitting diode installed to radiate light to the light guide member, and a connection pin for electrically connecting the first substrate to the second substrate.

The light guide member may include a ring portion fitted between the moving button and the upper plate such that an upper end of the ring portion is exposed to the outside of the housing, a light focusing portion for refracting light generated by the light-emitting diode of the second substrate such that the light is focused on the ring portion, a coil installation portion provided at an upper side of the second substrate, and having a diameter smaller than the ring portion such that the antenna coil is installed to the coil installation portion, and a coupling portion for coupling the light guide member to the second substrate.

The connection pin may be integrally formed to the light guide member by insert molding when the connection pin is injection molded to the coupling portion of the light guide member.

The housing may be formed therein with a partition wall which guides the moving button and forms a separate space portion.

The partition wall may include a bottom portion which protrudes from an inner peripheral surface of the housing toward a center thereof, has a through-hole formed at the center thereof, and constitutes a bottom of the space portion, and a guide portion which protrudes toward the upper portion of the housing from an inner circumference of the through-hole and has a tubular shape for guiding movement of the moving button.

The moving button may include a moving member fitted into the through-hole of the upper plate to be guided and moved by the guide portion of the partition wall of the housing, and a pressing member coupled to a lower end of the moving member to press the key pad.

The moving button may further include a damping member which reduces operating noise of the moving button between the moving member and the bottom portion of the partition wall.

The partition wall may have a bending prevention portion which encloses one side of the elastic protrusion portion in order to prevent the elastic protrusion portion from being bent by the pressing member.

Advantageous Effects

In accordance with the present invention, since an antenna coil is wound around a light guide member, separate parts for installing the antenna coil are not required as in the related art. Accordingly, it may be possible to improve productivity by reduction in manufacturing cost and assembly man-hour.

In addition, it may be possible to reduce the number of parts and conveniently manage the parts by integrally injection molding a connection pin for connecting the antenna coil to a printed circuit board to the light guide member.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view illustrating a button-type car ignition system according to an embodiment of the present invention;

FIG. 2 is an exploded perspective view illustrating the button-type ignition system of FIG. 1;

FIG. 3 is a cross-sectional view taken along line "A-A" of FIG. 1;

FIG. 4 is a cross-sectional view taken along line "B-B" of FIG. 1;

FIG. 5 is a perspective view illustrating a light guide member in the button-type ignition system of FIG. 1;

FIG. 6 is a cross-sectional view illustrating a state before a moving button is not pushed in the button-type ignition system of FIG. 4; and FIGS. 7 and 8 are cross-sectional views illustrating a state in which the moving button is pushed in the button-type ignition system of FIG. 4.

[Description of Reference Numerals]

| | |
|---|---|
| 100: button-type ignition system | |
| 110: housing | 111: partition wall |
| 120: upper plate | |
| 130: moving button | |
| 131: moving member | 132: pressing member |
| 133: damping member | |
| 140: bottom cover | |
| 150: printed circuit board | 151: light-emitting diode |
| 152: first substrate | 153: second substrate |
| 154: connection pin | |
| 160: key pad | 161: elastic protrusion portion |
| 170: light guide member | 171: ring portion |
| 172: light focusing portion | 173: coil installation portion |
| 174: coupling portion | |
| 180: antenna coil | |
| 190: coupling ring | |

BEST MODE FOR INVENTION

Reference will now be made in detail to embodiments of the present invention, examples of which are illustrated in the accompanying drawings. The drawings are not necessarily to scale and in some instances, proportions may have been exaggerated in order to clearly illustrate features of the embodiments.

FIG. 1 is a perspective view illustrating a button-type car ignition system according to an embodiment of the present invention. FIG. 2 is an exploded perspective view illustrating the button-type ignition system of FIG. 1. FIG. 3 is a cross-sectional view taken along line "A-A" of FIG. 1. FIG. 4 is a cross-sectional view taken along line "B-B" of FIG. 1. FIG. 5 is a perspective view illustrating a light guide member in the button-type ignition system of FIG. 1. FIG. 6 is a cross-sectional view illustrating a state before a moving button is not pushed in the button-type ignition system of FIG. 4. FIGS. 7 and 8 are cross-sectional views illustrating a state in which the moving button is pushed in the button-type ignition system of FIG. 4.

As shown in the drawings, a button-type car ignition system 100 according to an embodiment of the present invention includes a housing 110, an upper plate 120, a moving button 130, a bottom cover 140, a printed circuit board 150, a key pad 160, a light guide member 170, an antenna coil 180, and a coupling ring 190.

The housing 110 is a cylindrical member having opened upper and lower portions. The housing 110 has a space for accommodating the moving button 130, the printed circuit board 150, the key pad 160, and the light guide member 170 therein. Typically, the housing 110 is relatively fixed to a dash board near a steering wheel of a car. An upper end of the housing 110 is formed with a protrusion portion 110a which is bent outward. The protrusion portion 110a prevents the housing 110 from being caught and deeply installed by an upper end of a fixing portion of the dash board (not shown) when the housing 110 is fixed to the dash board. A stepped portion 110b to which the upper plate 120 to be described later is seated is formed inside an upper end portion of the housing 110. A partition wall 111 for forming a separate space portion 112 is formed inside the housing 110.

The partition wall 111 is formed toward a center from an inner peripheral surface of the housing 110. The partition wall 111 includes a bottom portion 111a having a through-hole formed at a center thereof, and a guide portion 111b which cylindrically protrudes toward the upper portion of the housing 110 from an inner circumference of the through-hole to guide movement of the moving button 130.

The space portion 112 is formed by an upper surface of the bottom portion 111a, an outer peripheral surface of the guide portion 111b, and an inner peripheral surface of the housing 110.

The upper plate 120 has a ring shape, and is fitted to an inner peripheral surface of an upper end of the housing 110 to be seated to the stepped portion 110b. The upper plate 120 has an indicator window 121 for indicating "OFF", "ACC", and "ON".

The moving button 130 is fitted inside the housing 110 to be exposed at the same height as the upper end of the housing 110. The moving button 130 reciprocates on an inner peripheral surface of the guide portion 111b of the partition wall 111 provided inside the housing 110 when a driver pushes the moving button 130.

The moving button 130 include a moving member 131 which is guided by the guide portion 111b of the partition wall 111 of the housing 110 to be vertically moved in a state of being fitted to the upper plate 120, and a pressing member 132 which is coupled to a lower end of the moving member 131 to press the key pad 160 to be described later.

The moving member 131 has a cylindrical shape in which the lower end thereof is opened and an upper end thereof is closed. The moving member 131 is fitted to the inner peripheral surface of the guide portion 111b and protrudes downward of the bottom portion 111a of the partition wall 111, so as to be coupled to the pressing member 132. A bent portion 131a which is spaced apart from an outer peripheral surface of the moving member 131 at a certain interval is formed at an edge of an upper end of the moving member 131. That is, a portion of an upper end of the guide portion 111b is fitted between the outer peripheral surface of the moving member 131 and the bent portion 131a.

An indicator window 131c for indicating "ENGINE", "START", and "STOP" is formed on an upper end surface of the moving member 131. At least one pair of coupling hooks 131b coupled to the pressing member 132 is formed at a lower portion of the moving member 131.

The pressing member 132 is configured such that a center thereof is penetrated and light emitted by light-emitting diodes of a first substrate 152 to be described later is radiated to the indicator window 131c of the moving member 131. A catching portion 132a which is caught and fixed by the coupling hooks 131b of the moving member 131 is formed at an inner circumference of the an upper end of the pressing member 132.

In addition, the moving button 130 further includes a damping member 133 which is coupled between the moving member 131 and the pressing member 132 to reduce operating noise of the moving button 130. The damping member 133 has a ring shape and is provided between the upper end of the pressing member 132 and a bottom surface of the bottom portion 111a of the partition wall 111. The damping member 133 prevents the upper end of the pressing member 132 from striking the bottom surface of the bottom portion 111a of the partition wall 111 when the moving member 131 is moved. It is preferable that the damping member 133 has elastic force for absorbing an impact caused by the pressing member 132 striking the bottom portion 111a of the partition wall 111 and is made of silicon having a rubber material.

The bottom cover 140 serves to cover and protect the lower portion of the housing 110, and is fitted and coupled to an inner peripheral surface of a lower end of the housing 110.

The key pad 160 is located between the first substrate 152 to be described later and the pressing member 132, and at least two elastic protrusion portions 161 protrude toward the pressing member 132. The elastic protrusion portions 161 are made of a rubber material having elastic restoring force, and are pressed by the pressing member 132 to push a switch of the first substrate 152 to be described later.

Meanwhile, the housing 110 has a bending prevention portion 113 which prevents bending of the elastic protrusion portions 161 when the elastic protrusion portions 161 are pressed by the pressing member 132. The bending prevention portion 113 is configured as a bending prevention protrusion portion which protrudes downward from a lower surface of the bottom portion 111a of the partition wall 111 of the housing 110 and is formed so as to come into contact with or be close to the key pad. The bending prevention protrusion portion has a semicircular cross-section shape and encloses one sides of the elastic protrusion portions 161.

The printed circuit board 150 includes a first substrate 152 provided between the key pad 160 and the bottom cover 140, a second substrate 153 provided in the space portion 112 of the housing 110, and a connection pin 154 for electrically connecting the first substrate 152 to the second substrate 153.

The first substrate 152 is located at a lower side of the key pad 160. The first substrate 152 has a plurality of light-emitting diodes 151 and a plurality of switches (not shown) installed to radiate light to the indicator window 131c of the moving button 130. The first substrate 152 is supplied with electricity from an external power source, and serves to generate operating signals of an engine starter motor or a fuel pump by electric connection such that a signal of an ignition key is recognized and the plurality of light-emitting diodes 151 emit light.

The second substrate 153 has a ring shape so as to be seated and coupled to the bottom portion 111a of the partition wall 111 of the housing 110. The second substrate has light-emitting diodes 151 installed to radiate light to the light guide member 170 to be described later and the indicator window 121 of the upper plate 120.

The connection pin 154 is integrally formed to the light guide member 170 to be described later. An upper end of the connection pin 154 is connected to the second substrate 153 and a lower end thereof is connected to the first substrate 152, so that the connection pin 154 serves to electrically connect the first substrate 152 to the second substrate 153.

The light guide member 170 guides and diffuses light generated by the light-emitting diodes 151 of the printed circuit board 150 toward the moving button 130, and includes a ring portion 171, a light focusing portion 172, a coil installation portion 173, and a coupling portion 174. That is, the light guide member 170 serves to diffuse light generated by the light-emitting diodes 151 such that the light radiated through the light guide member 170 is uniformly visible to the driver.

The ring portion 171 is provided between the moving button 130 and the upper plate 120, and is fitted to the outer peripheral surface of the guide portion 111b of the partition wall 111. An upper end of the ring portion 171 is exposed to the outside between the moving button 130 and the upper plate 120.

The light focusing portion 172 extends from a lower end of the ring portion 171. An outer peripheral surface of the light focusing portion 172 has a diameter increased downward. Consequently, the light focusing portion 172 refracts light generated by the light-emitting diodes 151 of the second substrate 153 such that the light is focused on the ring portion 171.

The coil installation portion 173 has an outer diameter smaller than the ring portion 171. The antenna coil 180 to be described later is installed on an outer peripheral surface of the coil installation portion 173. The coil installation portion 173 extends downward of the light focusing portion 172. The coil installation portion 173 protrudes toward a center of the light guide member 170 so as to have an inner diameter smaller than an inner peripheral surface of the ring portion 171, and a stepped portion 171a is formed at the coil installation portion 173. The stepped portion 171a prevents the moving member 131 from being caught and deeply pressed by the bent portion 131a of the moving member 131 when the moving member 131 is pressed during the operation of the moving button 130.

The coupling portion 174 protrudes toward the inner peripheral surface of the housing 110 from a lower end of the coil installation portion 173, and couples the light guide member 170 to the second substrate 153 and the bottom surface of the partition wall 111.

The coupling portion 174 has at least one coupling protrusion 174a which is fitted into a coupling hole formed on the second substrate 153 and the partition wall 111 and protrudes downward of the bottom portion 111a.

Here, components of the light guide member 170 are integrally formed with each other during injection molding, and the connection pin 154 is integrally formed to the coupling protrusion 174a by insert molding.

The antenna coil 180 is provided for short-distance communication of a Fob key for identification of a user in the car when low battery power is provided to the Fob key in a smart key system. The antenna coil 180 is wound around the coil installation portion 173 of the light guide member 170, and is electrically connected to the first substrate 152 or the second substrate 153 of the printed circuit board 150 by the connection pin 154.

The coupling ring 190 is fitted and coupled to the upper end of the housing 110 so as to prevent the upper plate 120 coupled to the housing 110 from being decoupled therefrom.

The coupling ring 190 has a fitting groove formed around a lower end thereof so as to be fitted to the upper end of the housing 110. A coupling protrusion portion 191 having a coupling hole which is caught and coupled to a catching protrusion 111c formed on the outer peripheral surface of the upper end of the housing 110 is formed at a lower end of the coupling ring 190 so as to protrude therefrom.

Hereinafter, an operation of the button-type car ignition system according to the embodiment of the present invention will be described.

First, after the first substrate 152 is fitted and coupled to the coupling portion 174 of the light guide member 170, the light guide member 170 coupled with the first substrate 152 is fitted into the space portion 112 of the housing 110 to be seated to the bottom portion 111a of the partition wall 111. Here, the connection pin 154 is prepared so as to be integrally formed to the light guide member 170 by insert molding during injection molding of the light guide member 170.

Next, after the moving member 131 is fitted into the guide portion 111b of the partition wall 111 through the opened upper portion of the housing 110, the damping member 133 is fitted inside the housing 110 through the opened lower portion of the housing 110 so as to come into close contact with the lower portion of the moving member 131. After the pressing member 132 is fitted through the opened lower portion of the housing 110, the coupling hook 131b of the moving member 131 is coupled to the catching portion 132a of the pressing portion 132. As a result, the pressing member 132 and the moving member 131 are fully coupled to the housing 110.

Subsequently, after the key pad 160 and the first substrate 152 are inserted into the housing 110 through the opened lower portion of the housing 110, the bottom cover 140 is coupled to the lower end of the housing 110.

After the upper plate 120 is coupled to the inner circumference of the upper end of the housing 110, the coupling ring 190 is coupled to the upper end of the housing 110. As a result, the assembly of the button-type ignition system 100 is completed.

Hereinafter, a mechanical operation process of the button-type car ignition system according to the embodiment of the present invention will be described in brief.

First, in a state shown in FIG. 6, when the driver applies external force to the moving member 131 of the moving button 130 using a finger thereof, the moving member 131 is guided by the inner peripheral surface of the guide portion 111b of the partition wall 111 of the housing 110 and is moved downward. In this case, the damping member 133 and the pressing which are coupled to the moving member 131 are moved downward together.

The pressing member 132 elastically deforms the elastic protrusion portion 161 by pressing the elastic protrusion portion 161 of the key pad 160. In this case, the elastic protrusion portion 161 operates the switch installed to the first substrate 152 of the printed circuit board 150.

Subsequently, when the driver removes the external force applied to the moving member 131, the moving button 130, namely, the moving member 131, the damping member 133, and the pressing member 132 are moved to original positions by the elastic force of the elastic protrusion portion 161 pressed by the pressing member 132.

Here, the damping member 133 serves to reduce noise caused in the process in which the moving button 130 is moved to the original state.

In the button-type car ignition system 100 according to the embodiment of the present invention having the above configuration, the antenna coil 180 is installed to the light guide member 170 in order for light generated by the light-emitting diodes 151 to be guided and uniformly diffused to the upper portion of the moving button 130, thereby enabling the number of parts and manufacturing cost to be reduced since separate parts for installing the antenna coil 180 are not required.

Various embodiments have been described in the best mode for carrying out the invention.

INDUSTRIAL APPLICABILITY

In accordance with a button-type car ignition system according to the present invention, since an antenna coil is wound around a light guide member, separate parts for installing the antenna coil are not required as in the related art. Accordingly, it may be possible to improve productivity by reduction in the number of parts, assembly man-hour, and manufacturing cost.

Although the present invention has been described with respect to the illustrative embodiments, it will be apparent to those skilled in the art that various variations and modifications may be made without departing from the spirit and scope of the invention as defined in the following claims.

The invention claimed is:
1. A button-type car ignition system comprising:
a housing having opened upper and lower portions;
an upper plate coupled to an upper end of the housing and having a through-hole;
a moving button arranged to reciprocate inside the housing;
a cover coupled to the lower portion of the housing;
a printed circuit board arranged inside the housing and having one or more light-emitting diodes;
a key pad having an elastic protrusion portion pressed by the moving button;
a light guide member for guiding light generated by the light-emitting diodes to the moving button; and
an antenna coil installed on and wound onto the light guide member so as to transmit and receive wireless signals to and from an ignition key;
wherein the light guide member comprises:
a ring portion fitted between the moving button and the upper plate such that an upper end of the ring portion is exposed to the outside of the housing; and
a light focusing portion configured for refracting light generated by the light-emitting diodes such that the light is focused on the ring portion.
2. The button-type car ignition system according to claim 1, wherein the printed circuit board comprises:

a first substrate provided between the cover and the key pad and having a light-emitting diode installed to radiate light to the moving button;

a second substrate having a light-emitting diode installed to radiate light to the light guide member; and a connection pin for electrically connecting the first substrate to the second substrate.

3. The button-type car ignition system according to claim 2, wherein:

the light focusing portion is configured for refracting light generated by the light-emitting diode of the second substrate such that the light is focused on the ring portion; and wherein the light guide member comprises:

a coil installation portion provided at an upper side of the second substrate, and having a diameter smaller than the ring portion such that the antenna coil is installed to the coil installation portion; and a coupling portion for coupling the light guide member to the second substrate.

4. The button-type car ignition system according to claim 3, wherein the coupling portion of the guide member is molded around the connection pin.

5. The button-type car ignition system according to claim 1, wherein the housing is formed with a partition wall which guides the moving button and forms a separate space portion.

6. The button-type car ignition system according to claim 5, wherein the partition wall comprises a bottom portion which protrudes from an inner peripheral surface of the housing toward a center thereof, has a through-hole formed at the center thereof, and constitutes a bottom of the space portion, and a guide portion which protrudes toward the upper portion of the housing from an inner circumference of the through-hole and has a tubular shape for guiding movement of the moving button.

7. The button-type car ignition system according to claim 6, wherein the moving button comprises:

a moving member fitted into the through-hole of the upper plate to be guided and moved by the guide portion of the partition wall of the housing; and a pressing member coupled to a lower end of the moving member to press the key pad.

8. The button-type car ignition system according to claim 6, wherein the moving button further comprises a damping member which reduces operating noise of the moving button between the moving member and the bottom portion of the partition wall.

9. A button-type car ignition system, comprising:

a housing having opened upper and lower portions;

an upper plate coupled to an upper end of the housing and having a through-hole;

a moving button arranged to reciprocate inside the housing;

a cover coupled to the lower portion of the housing;

a printed circuit board arranged inside the housing and having one or more light-emitting diodes;

a key pad having an elastic protrusion portion pressed by the moving button;

a light guide member for guiding light generated by the light-emitting diodes to the moving button; and an antenna coil installed to the light guide member so as to transmit and receive wireless signals to and from an ignition key;

wherein the housing is formed with a partition wall which guides the moving button and forms a separate space portion; and wherein the partition wall has a bending prevention portion which encloses one side of the elastic protrusion portion in order to prevent the elastic protrusion portion from being bent by the pressing member.

* * * * *